(12) United States Patent
Saito et al.

(10) Patent No.: US 6,257,386 B1
(45) Date of Patent: Jul. 10, 2001

(54) POWER CUT/CONNECT DEVICE

(75) Inventors: Takahide Saito; Tatsuo Kawase; Takashi Nozaki; Makoto Yasui; Shiro Goto, all of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/511,786

(22) Filed: Feb. 23, 2000

(30) Foreign Application Priority Data

Feb. 24, 1999 (JP) ................................................. 11-046842
Feb. 24, 1999 (JP) ................................................. 11-046870

(51) Int. Cl.[7] ................................................ B60K 17/00
(52) U.S. Cl. ............................ 192/48.2; 192/37; 192/38; 192/43.1; 192/44; 192/84.21
(58) Field of Search ................................. 192/35, 37, 38, 192/43.1, 44, 48.2, 48.4, 48.8, 48.92, 84.21, 84.8

(56) References Cited

U.S. PATENT DOCUMENTS

| | | | |
|---|---|---|---|
| 2,251,464 | * 8/1941 | Neracher et al. | .................. 475/66 |
| 3,941,199 | * 3/1976 | Williams | .............................. 180/249 |
| 4,597,467 | * 7/1986 | Stockton | ................................ 180/248 |
| 5,129,871 | * 7/1992 | Sandel et al. | ......................... 475/297 |
| 5,971,123 | * 10/1999 | Ochab et al. | ......................... 192/48.2 |

FOREIGN PATENT DOCUMENTS 60-241532 * 11/1985 (JP) ........................................ 192/44

* cited by examiner

*Primary Examiner*—Richard M. Lorence
(74) *Attorney, Agent, or Firm*—Wenderoth, Lind & Ponack, L.L.P.

(57) ABSTRACT

A power cut/connect device is proposed which is axially compact and is usable in a limited space. The device includes a first input member coupled to a power shaft, an output member mounted coaxially with the first input member, a first two-way clutch provided between the first input member and the output member, a second input member coaxially mounted with the output member, a second two-way clutch provided between the output member and the second input member so as to be disposed coaxially with and around the first two-way clutch, and a control unit for controlling the first and second two-way clutches for interruption and connection of power.

23 Claims, 12 Drawing Sheets

POWER CUT/CONNECT DEVICE

BACKGROUND OF THE INVENTION

This invention relates to a power cut/connect device used for changeover between transmission and cutoff of power in a power transmission line.

In various machines or vehicles, to selectively cause rotation of two different driving sources to drive them, it is necessary to use a power cut/connect device in a power transmission line.

For such a power cut/connect device, the following functions are required: cutting off connection between one power source and the output member when the rotation of the other power source is to be transmitted to the output member, cutting off connection between the other power source and the output member when the rotation of the one power source is to be transmitted to the output member, and driving the one power source by the other power source with the rotation of the output member connected with both power sources. To perform these functions, two clutches are required for connection and cutoff of the two power sources with the output member.

Heretofore, in such a power cut/connect device, two clutches are arranged spaced from each other in the axial direction of the output member, one clutch being associated with an input member coupled to one power source, and the other clutch being associated with an input member coupled to the other power source.

In a conventional power cut/connect device, since the two clutches are arranged spaced from each other in the axial direction of the output member, the entire length tends to be long in the axial direction. Thus it cannot be used in a location where the mounting space is narrow, so that the usefulness is limited.

An object of this invention is to provide a power cut/connect device which is compact in the axial direction, and which can be mounted at a position where the mounting space is limited, thereby expanding its usefulness.

SUMMARY OF THE INVENTION

According to this invention, there is provided a power cut/connect device comprising: a first input member coupled to a power shaft and having an outer surface; an output member coaxially mounted around the first input member and having an inner surface and an outer surface; one of the outer surface of the first input member and the inner surface of the output member being formed with a first cylindrical surface and the other being formed with a plurality of first cam surfaces opposite the first cylindrical surface to define wedge spaces therebetween; a first retainer mounted between the first cylindrical surface and the first cam surfaces and formed with a plurality of pockets; first engaging elements each received in each of the pockets of the first retainer and capable of interlocking the first input member and the output member together by engaging the first cylindrical surface and the first cam surfaces when the first input member and the output member rotate relative to each other; the first cylindrical surface, the first cam surfaces, the first retainer, and the first engaging elements forming a first two-way clutch; a second input member coaxially mounted around the output member and having an inner surface; one of the outer surface of the output member and the inner surface of the second input member being formed with a second cylindrical surface and the other being formed with a plurality of second cam surfaces opposite the second cylindrical surface to define wedge spaces therebetween; a second retainer mounted between the second cylindrical surface and the second cam surfaces and formed with a plurality of pockets; second engaging elements each received in each of the pockets of the second retainer and capable of interlocking the output member and the second input member together by engaging the second cylindrical surface and the second cam surfaces when the second input member and the output member rotate relative to each other; the second cylindrical surface, the second cam surfaces, the second retainer, and the second engaging elements forming a second two-way clutch; the second two-way clutch being disposed radially outwardly of the first two-way clutch; the output member functioning both as an outer member of the first two-way clutch and as an input member of the second two-way clutch; a control means for individually controlling the first and second retainers to selectively engage and disengage the first and second two-way clutches.

In the abovesaid arrangement, a cylindrical surface is formed on one of the opposing surfaces between the first input member and the output member and a plurality of cam surfaces are formed on the other. Also, similarly a cylindrical surface is formed on one of the opposing surfaces between the second input member and the output member and a plurality of cam surfaces are formed on the other. Instead of such a structure, cylindrical surfaces may be formed on both of the opposing surfaces between the first input member and the output member and on both of the opposing surfaces between the second input member and the output member, and engaging members may be mounted in a retainer mounted between these opposing surfaces.

Also, although in the abovesaid arrangement, a single output member is employed, two separate output members may be employed which are coaxially mounted one around the other through a bearing so as to be rotatable relative to each other. In this arrangement, a first two-way clutch is provided between the first input member and a first output member and a second two-way clutch is provided between a second output member and the second input member.

Other features and objects of the present invention will become apparent from the following description made with reference to the accompanying drawings, in which:

BRIEF DESCRIPTION OF THE DRAWINGS

FIGS. 7A and 7B show a second embodiment of a power cut/connect device, in which

DETAILED DESCRIPTION OF THE PREFERRED EMBODIMENTS

Hereinbelow, embodiments of this invention are described with reference to the accompanying drawings.
(First Embodiment)

In the first embodiment shown in FIGS. 1 through 6, the rotation cut/connect device 11 comprises a first input member 12 which is a shaft connected to a power shaft and rotatably mounted, a cylindrical output member 14 coaxially mounted around the first input member 12 and rotatably supported by a bearing 13, a first two-way clutch 15 provided between the first input member 12 and the output member 14, a second input member 17 mounted coaxially around the output member 14 and rotatably supported by a bearing 16, and a second two-way clutch 18 provided between the second input member 17 and the output member 14. The device 11 is arranged to cut off and connect power by controlling the first and second two-way clutches 15, 18 by means of first and second control means 19, 20.

Figure 1:
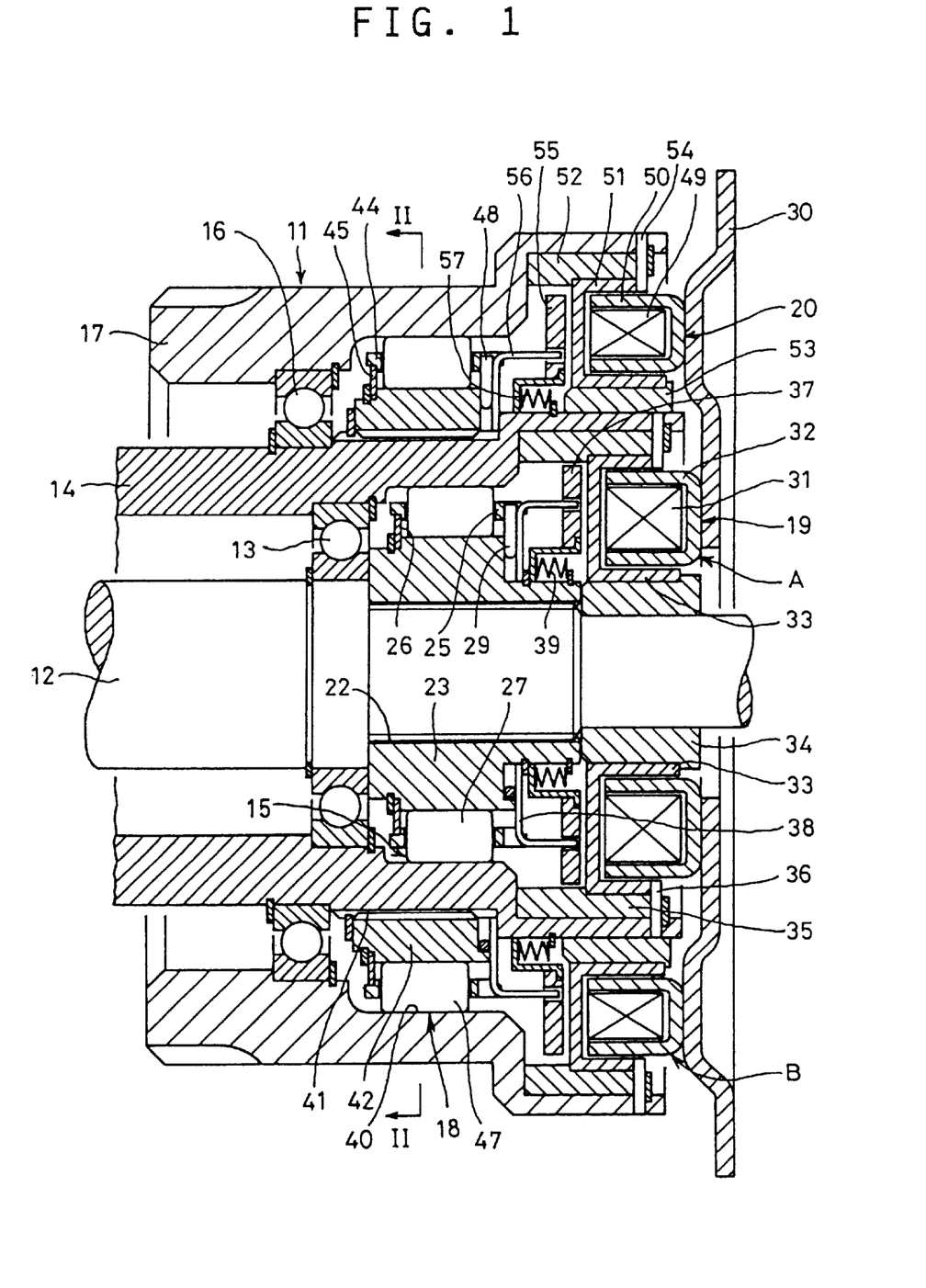
FIG. 1 is a vertical sectional view of a first embodiment of a power cut/connect device.

As shown, the output member 14 is commonly used as an outer member of the first two-way clutch 15 and an inner member of the second two-way clutch 18. The first two-way clutch 15 and the second two-way clutch 18 are arranged with the latter disposed coaxially and radially outwardly of the former. Also, the first and second control means 19, 20 are arranged with the latter disposed coaxially and radially outside of the former.

Figure 2:
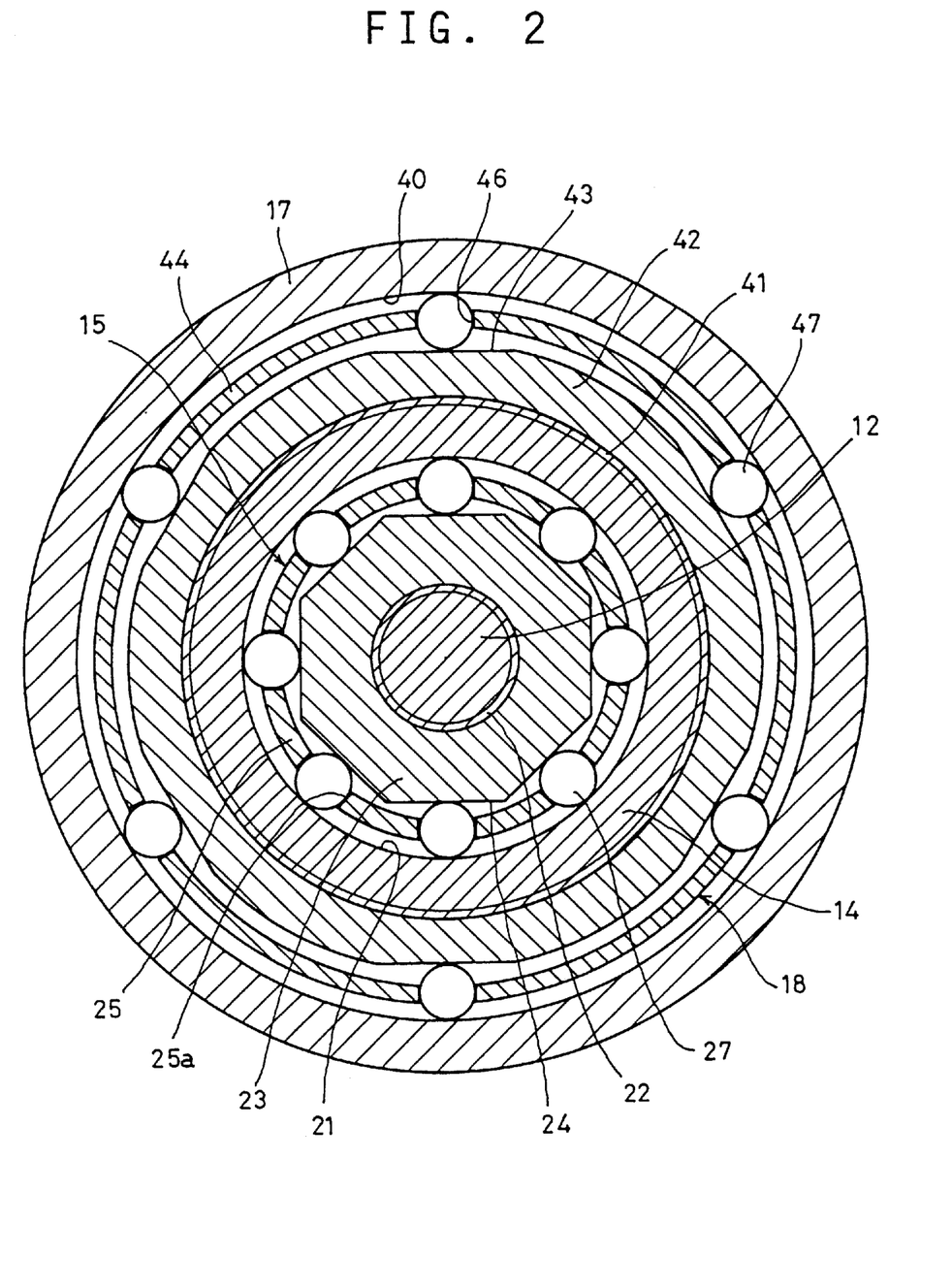
FIG. 2 is a sectional view along arrow II—II of FIG. 1.

For the first two-way clutch 15, as in FIGS. 1 and 2, a cylindrical surface 21 is formed on the inner surface of the output member 14 and a separate cam member 23 is fixed to the first input member 12 through splines 22 so as to rotate as one piece. On the outer surface of the cam member 23, a plurality of cam surfaces (or clutch surfaces) 24 are formed spaced a predetermined angular distance from each other. Each cam surface 24 defines a wedge-shaped space which is narrow on both sides thereof between itself and the cylindrical surface 21 of the output member 14.

Between the outer surface of the cam member 23 fixed to the first input member 12 and the inner cylindrical surface 21 of the output member 14, a first retainer 25 is inserted. One end of the first retainer 25 is rotatably supported by the cam member 23 through a plate 26. In the retainer 25, as in FIG. 2, as many pockets 25a as there are cam surfaces 24 are formed circumferentially. A roller 27 as an engaging element is mounted in each pocket 25a. One roller 27 is mounted for each cam surface 24 of the cam member 23. When the rollers 27 are moved a predetermined distance in either circumferential direction by the first retainer 25, they will engage between the cam surfaces 24 and the cylindrical surface 21, thus interlocking the first input member 12 and the output member 14.

Figure 4:
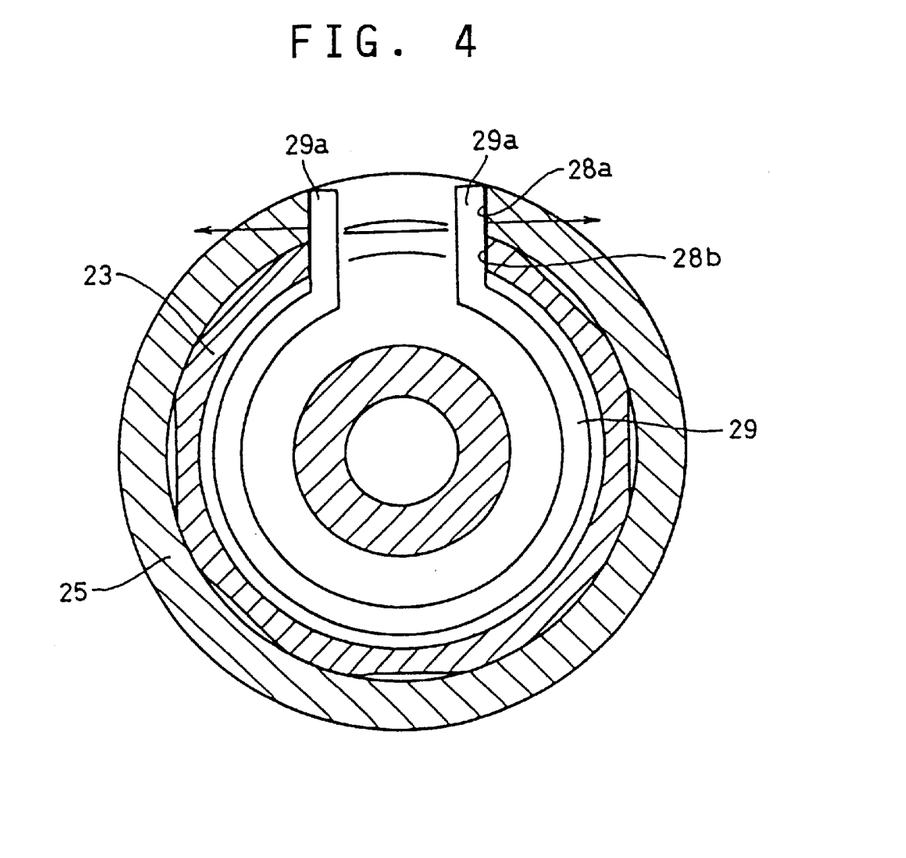
FIG. 4 is a sectional view showing the structure of a retainer and a switch spring.

As shown in FIG. 4, the first retainer 25 and the cam member 23 are formed with cutouts 28a, 28b, respectively, at a part of their circumference. A switch spring 29 as an elastic member is mounted therein with its two ends 29a set in the cutouts.

The cutouts 28a, 28b are provided on a side adjacent an armature which is described later.

Figure 3:
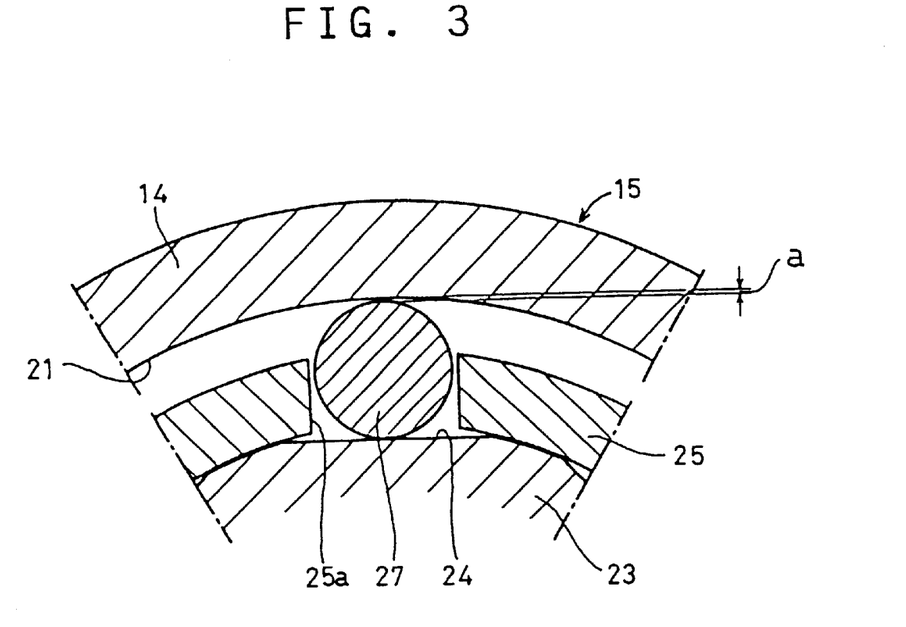
FIG. 3 is an enlarged sectional view of a portion of a two-way clutch.

The first retainer 25 and the cam member 23 are mounted such that when their cutouts 28a, 28b are in alignment, the cam surfaces 24 of the cam member 23, the pockets 25a of the retainer 25 and the rollers 27 are in such a position that the rollers 27 are in their neutral positions as shown in FIG. 3, where there exists a gap a between each roller 27 and the cylindrical surface 21. When the switch spring 29 is set, the first input member 12 and the output member 14 do not engage but can idle.

As shown in FIG. 1, the output member 14 has a larger-diameter end. Between the inner surface of this large-diameter portion and the input member 12, a first electromagnetic clutch A, which works as a first control means, is mounted.

The clutch A comprises a field core 32 housing an electromagnetic coil 31 and fixed to a stationary portion 30 provided outside the end of the output member 14. A rotor 33 rotatably mounted around the field core 32 is mounted between a rotor guide 34 mounted on the first input member 12 and a rotor guide 35 mounted in the output member 14. The rotor 33 and the rotor guide 35 are coupled to the output member 14 by pins 36. Between the rotor 33 and the first retainer 25, an armature 37 attracted by the magnetic force of the electromagnetic coil 31 is arranged so as to face the rotor 33.

The armature 37 is supported by a retaining member 38 inserted in the cam member 23 so as to be axially movable relative to the cam member 23 and so as to rotate together with the cam member 23. The retaining member 38 engages in the cutout 28a of the first retainer 25, so that the armature 37 and the first retainer 25 are made integral in the rotating direction through the retaining member 38.

The armature 37 is lightly biased by a spring 39 in such a direction that it is always spaced from the rotor 33. It is attracted by the magnetic force due to activation of the electromagnetic coil 31 toward the rotor 33. While the electromagnetic coil 31 is not activated, a gap is formed between opposed surfaces of the armature 37 and the rotor 33 to prevent wear of the opposed surfaces during relative rotation between them.

Thus, the field core 32 is a fixed member, and the output member 14, rotor guide 35 and rotor 33 will not rotate relative to each other at any time because they are interconnected by the pins 36. The rotor 33 serves as a friction member fixed to the output member 14.

Since the rotor 33 is fixed to the output member 14 and the armature 37 is connected to the first input member 12 through the retainer 25, switch spring 29 and cam member 23, relative rotation between the output member 14 and the first input member 12 is possible.

For the second two-way clutch 18, a cylindrical surface 40 is formed on the inner surface of the second input member 17, and corresponding to this, a cam member 42 is fixed to the outer periphery of the output member 14 through splines 41 so as to rotate together. On the outer surface of the cam member 42, a plurality of flat cam surfaces 43 are formed spaced a predetermined distance from each other (FIG. 2). Each cam surface 43 defines a wedge-shaped space which is narrow on both sides thereof between itself and the cylindrical surface 40 of the second input member 17.

Between the outer surface of the cam member 42 fixed to the output member 14 and the inner cylindrical surface 40 of the second input member 17, a second retainer 44 is inserted. One end of the second retainer 44 is rotatably supported by the cam member 42 through a plate 45. In the retainer 44, as in FIG. 2, as many pockets 46 as there are cam surfaces 43 are formed circumferentially. A roller 47 as an engaging element is mounted in each pocket 46. One roller 47 is mounted on each cam surface 43 of the cam member 42. When the rollers 47 are moved a predetermined distance in either circumferential direction by the second retainer 44, they will engage between the cam surfaces 43 and the cylindrical surface 40, thus interlocking the second input member 17 and the output member 14 together.

While not shown, like the first two-way clutch 15, the second retainer 44 and the cam member 42 are both formed with a cutout at a portion of their circumference. A switch spring 48, which is an elastic member, is bent with both ends thereof set in the cutout.

The second retainer 44 and the cam member 42 are set such that when their cutouts are in alignment, the cam surfaces 43 of the cam member 42, the pockets 46 of the retainer 44 and the rollers 47 are in such positions that the rollers 47 are in neutral positions just as shown in FIG. 3. Thus, there exists a gap a between each roller 47 and the cylindrical surface 40. Thus when the switch spring 48 is set, the second input member 17 and the output member 14 will not engage and can idle.

As shown in FIG. 1, the output member 14 has a larger-diameter end. Between the inner surface of this large-diameter portion and the output member 14, a second electromagnetic clutch B, which is a second control means 20, is mounted.

In the electromagnetic clutch B, a field core 50 housing an electromagnetic coil 49 is fixed to the stationary member 30 provided at a position beyond the end of the second input member 17. A rotor 51 rotatably mounted around the field core 50 is mounted between a rotor guide 52 mounted in the second input member 17 and a rotor guide 53 mounted on the output member 14. The rotor 51 and the rotor guide 52 are coupled to the second input member 17 by pins 54. Between the rotor 51 and the second retainer 44, an armature 55 attracted by the magnetic force of the electromagnetic coil 49 is arranged so as to face the rotor 51.

The armature 55 is supported by a retaining member 56 inserted in the cam member 42 so as to be movable in the axial direction relative to the cam member 42 and so as to rotate together with the cam member 42. The retaining member 56 engages in the cutout of the second retainer 44, and the armature 55 and the second retainer 44 are made integral in the rotating direction through the retaining member 56.

The armature 55 is lightly biased by a spring 57 in such a direction that it is always spaced from the rotor 51. It is attracted by the magnetic force due to activation of the electromagnetic coil 49 toward the rotor 51. While the electromagnetic coil 49 is not activated, a gap is formed between opposed surfaces of the armature 55 and the rotor 51 to prevent wear of the opposed surfaces during relative rotation between them.

Thus, the field core 50 is a fixed member, and the second input member 17, rotor guide 52 and rotor 51 will not rotate relative to each other at any time. The rotor 51 serves as a friction member fixed to the second input member 17.

Since the rotor 51 is coupled to the second input member 17 and the armature 55 is coupled to the output member 14 through the retainer 44, switch spring 48 and cam member 42, relative rotation between the output member 14 and the second input member 17 is possible.

As shown in FIG. 1, the second two-way clutch 18 is located radially outside of the first two-way clutch 15, and the second electromagnetic clutch B is positioned radially outside of the first electromagnetic clutch A. By this coaxial arrangement, it is possible to shorten the axial length of the power cut/connect device 11.

Figure 5:
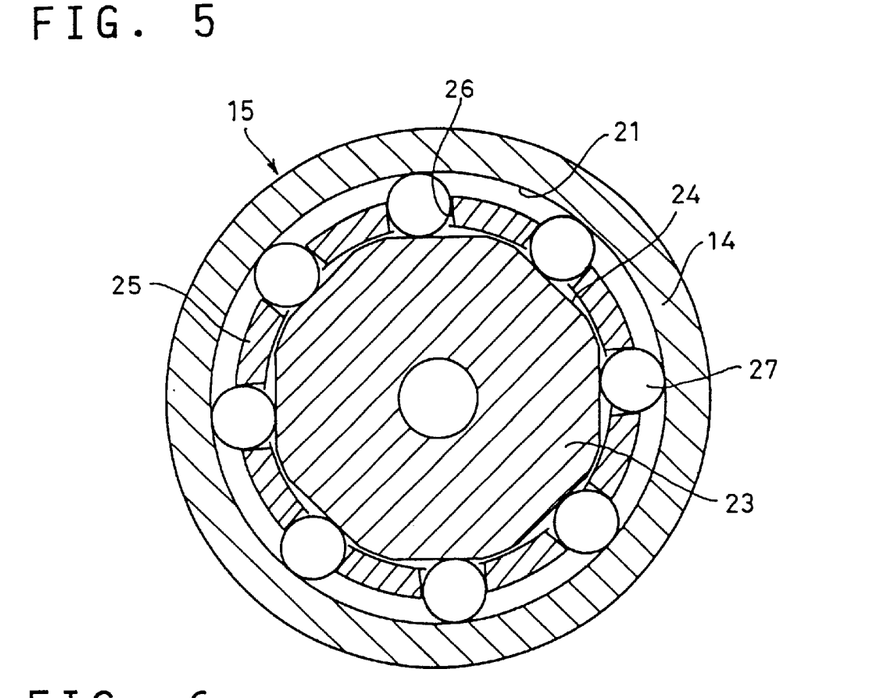
FIG. 5 is a sectional view showing another example of a two-way clutch.
Figure 6:
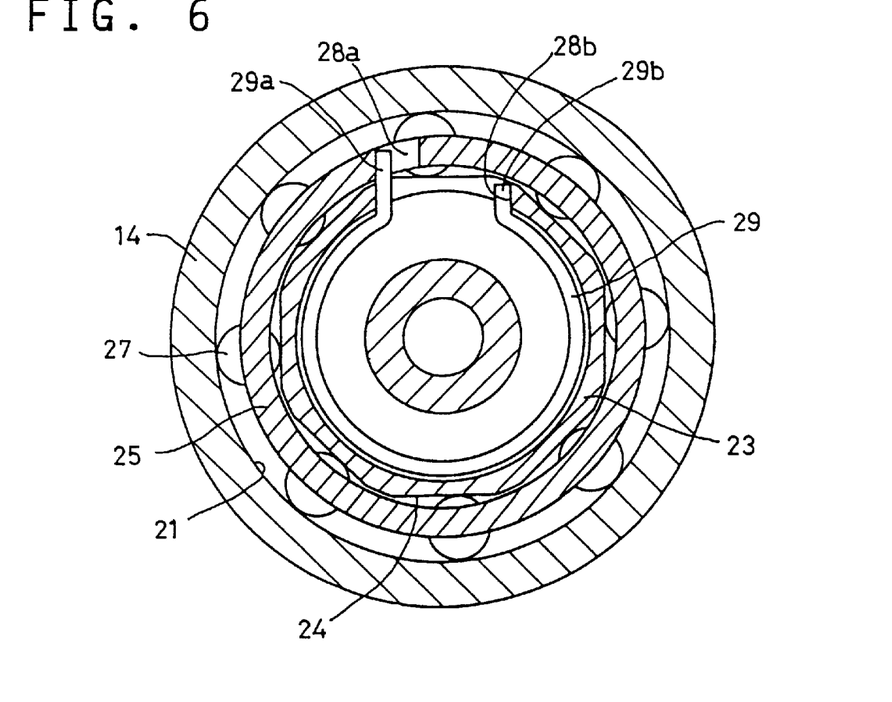
FIG. 6 is a sectional view showing the relation between the other example of a two-way clutch and a switch spring.

FIGS. 5 and 6 show an example of the first two-way clutch 15 in which the rollers 27 are always retained in one of the engaging positions. In this example, by engaging one end of the switch spring 29 in the cutout 28b of the cam member 23, and its other end in the cutout 28a of the first retainer 25, the first retainer 25 is resiliently biased in one circumferential direction relative to the cam member 23, thereby retaining the rollers 27 in one of the engaging positions.

By making the first two-way clutch 15 normally engaged to one side, it is possible to do away with the control for engagement to one side by the first electromagnetic clutch A. A similar structure may be employed for the second two-way clutch 18, too.

The rotation cut/connect device 11 of the first embodiment is structured as mentioned above. In operation, when no current is supplied to the first and second electromagnetic coils 31, 49, by the action of the switch springs 29, 48, the rollers 27, 47 are held in their neutral positions, in which they do not engage the cam surfaces 24, 43. The first two-way clutch 15 thus releases engagement between the first input member 12 and the output member 14, while the second two-way clutch 18 releases engagement between the second input member 17 and the output member 14, so that the rotations of the first and second input members 12, 17 will not be transmitted to the output member 14.

When the electromagnetic coil 31 of the first electromagnetic clutch A is actuated with the first input member 12 rotating, due to its magnetic force, the armature 37 and the rotor 33 are pressed against each other. When the first input member 12 and the output member 14 tend to rotate relative to each other in this state, due to the frictional force produced between the armature 37 and the rotor 33, the first retainer 25 and the output member 14 are coupled together into one piece, so that the rollers 27 are moved from the neutral positions on the cam surfaces 24 to engaging positions in the wedge spaces. Thus, the first two-way clutch 15 couples the first input member 12 and the output member 14 together, so that the rotation of the first input member 12 is transmitted to the output member 14.

Thus, when the electromagnetic coil 31 of the first electromagnetic clutch A is actuated, it is possible to lock the first input member 12 and the output member 14 together. At this time, the rollers 27 are moved to an engaging position, but as shown in FIG. 4, the force applied in one direction to the retainer 25 by the switch spring 29 is axially adjacent the moment applied from the armature 37, and no moment about the axis perpendicular to the central axis acts on the retainer 25. Thus, the retainer 25 can rotate smoothly relative to the first input member 12 with no necessity of using bearings.

Also, as described above, by commonly using the cutout 28b of the cam member 23 both to receive the switch spring 29 and to receive the retaining member 38 of the armature 37, it is possible to reduce the number of working steps and the cost.

Next, when the second electromagnetic coil 49 is actuated with the second input member 17 rotating, like in the case of the first electromagnetic clutch A, due to the magnetic force of the electromagnetic coil 49, the armature 55 and the rotor 51 are pressed against each other. When the second input member 17 and the output member 14 tend to idle relative to each other, due to the frictional force produced between the armature 55 and the rotor 51, the second retainer 44 and the second input member 17 are coupled together. Thus, the rollers 47 are moved from the neutral position on the cam surfaces 43 to one engaging position in the wedge spaces, so that the second two-way clutch 18 couples the second input member 17 and the output member 14 together. The rotation of the second input member 17 is thus transmitted to the output member 14.

Thus, by the on-off control of the first and second electromagnetic clutches A, B with the first or second input member 12, 17 rotating, it is possible to transmit and cut off rotation of the first and second input members 12, 17 to the output member 14, and further to transmit rotation between the first and second input members 12 and 17. Thus it is possible to use the power cut/connect device of this invention in a wide field in which the transmission and cutoff of driving force have to be changed over.

That is, when the first and second electromagnetic clutches A, B are both turned on with one of the first and second input members 12, 17 rotating, the first and second two-way clutches 15 and 18 will both engage, so that the first and second input members 12 and 17 are coupled together through the output member 14 and thus it is possible to transmit rotation therebetween.

(Second Embodiment)

FIGS. 7A–8B show a second embodiment of a power cut/connect device 11. In this embodiment, sprags are used as the engaging elements of the first and second two-way clutches 15, 18 instead of rollers. Meanwhile, since the first and second two-way clutches have the same structure, only the first two-way clutch 15 is described as an example.

Figure 7A:
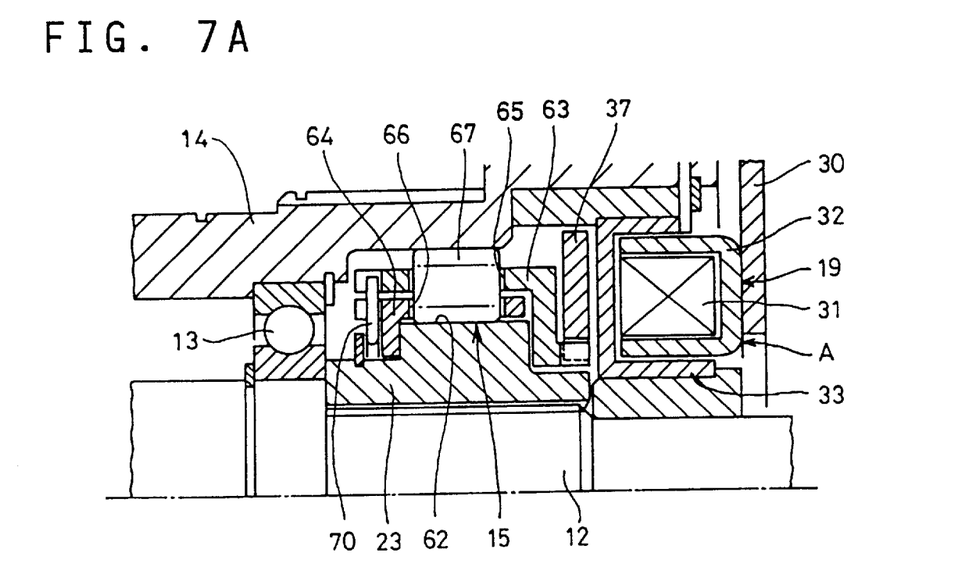
FIG. 7A is a vertical sectional front view of a two-way clutch using sprags.
Figure 7B:
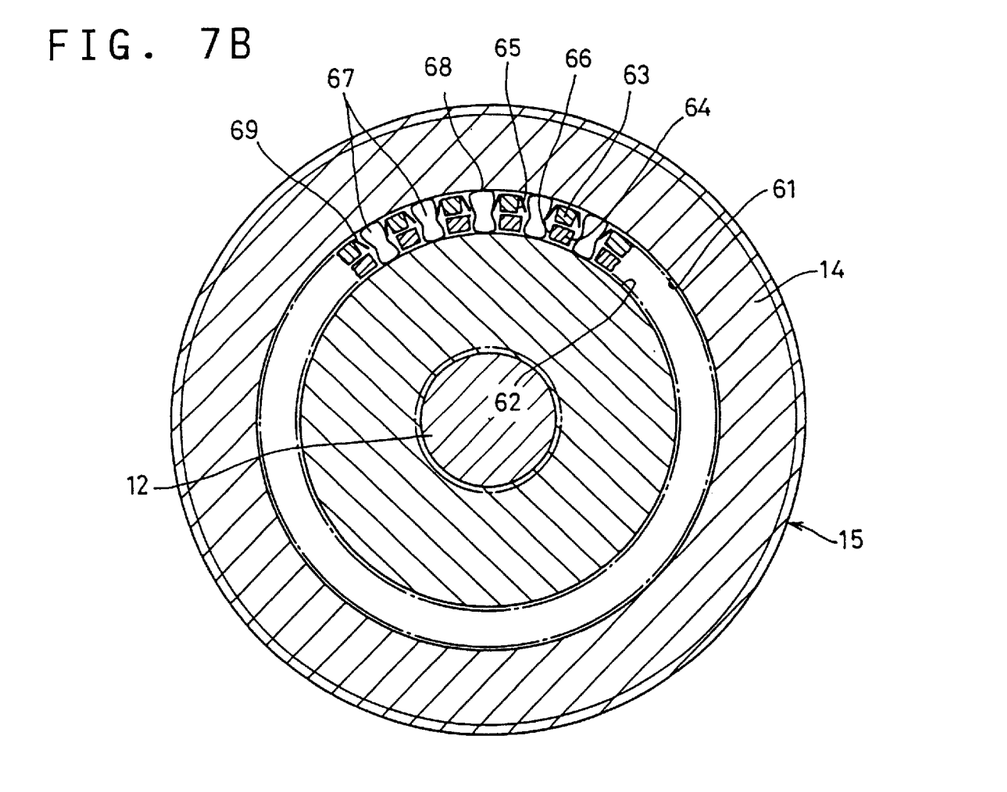
FIG. 7B is its vertical sectional side view.

Cylindrical surfaces 61 and 62 are formed on the outer surface of the first input member 12 and the opposed inner surface of the output member 14, respectively. A control retainer 63 and a fixed retainer 64 having different diameters are mounted between the surfaces 61 and 62. Both retainers 63 and 64 are formed with a plurality of pockets 65, 66 arranged at equal angular intervals. In the opposed pockets 65, 66, sprags 67 as engaging elements are mounted. At both ends of the sprags 67, arcuate surfaces 68 are formed that engage the surfaces 61 and 62 when the sprags 67 are tilted in either direction to couple the first input member 12 and the output member 14 together.

For the control retainer 63, springs 69 for holding the sprags 67 from both sides are provided. The control retainer 63 is coupled to the armature 37 in the first electromagnetic clutch A so as to be integral in the rotating direction and movable in the axial direction. The fixed retainer 64 is fixed to the first input member 12. A switch spring 70 has its two ends engaged in cutouts formed in the control retainer 63 and the fixed retainer 64 to keep the sprags in their neutral positions through the control retainer 63.

Figure 8A:
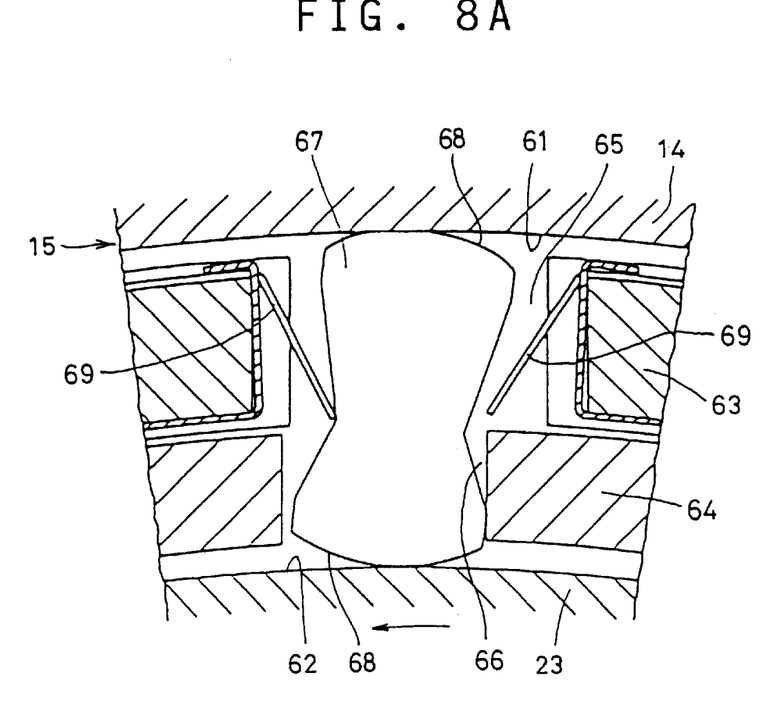
FIGS. 8A and 8B are enlarged sectional views showing the operation of the sprags.
Figure 8B:
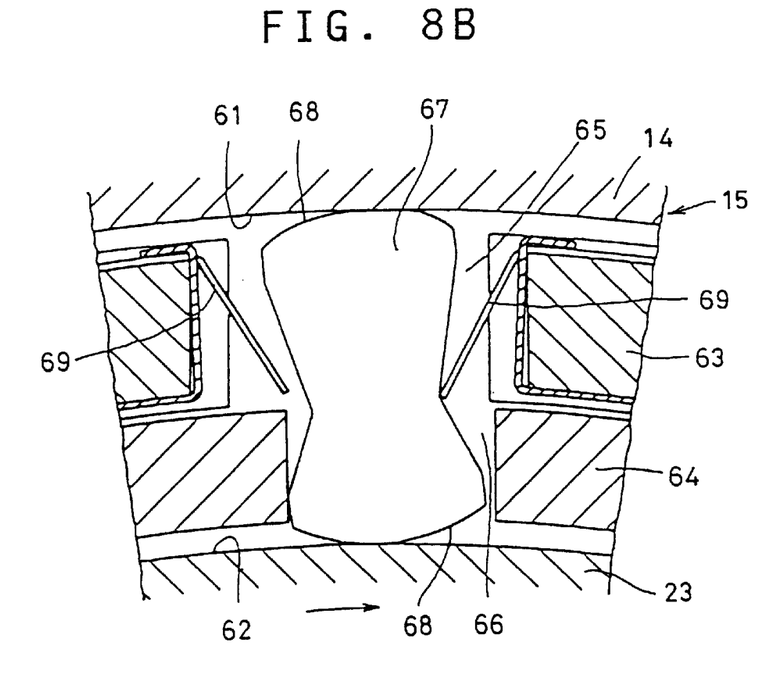

With the first two-way clutch 15, when the first clutch A is activated, the armature 37 is attracted to the rotor 33, so that a phase shift in the circumferential direction occurs between the control retainer 63 and the fixed retainer 64, so that the sprags 67 are tilted. Rotation of the first input member 12 is thus transmitted to the output member 14.

(Third Embodiment)

FIGS. 9 through 12 show a third embodiment of a power cut/connect device 11. In this embodiment, a resistance means for softening shocks is provided in a mid-portion of the output member 14 or between the second input member 17 and the output member 14.

Figure 9:
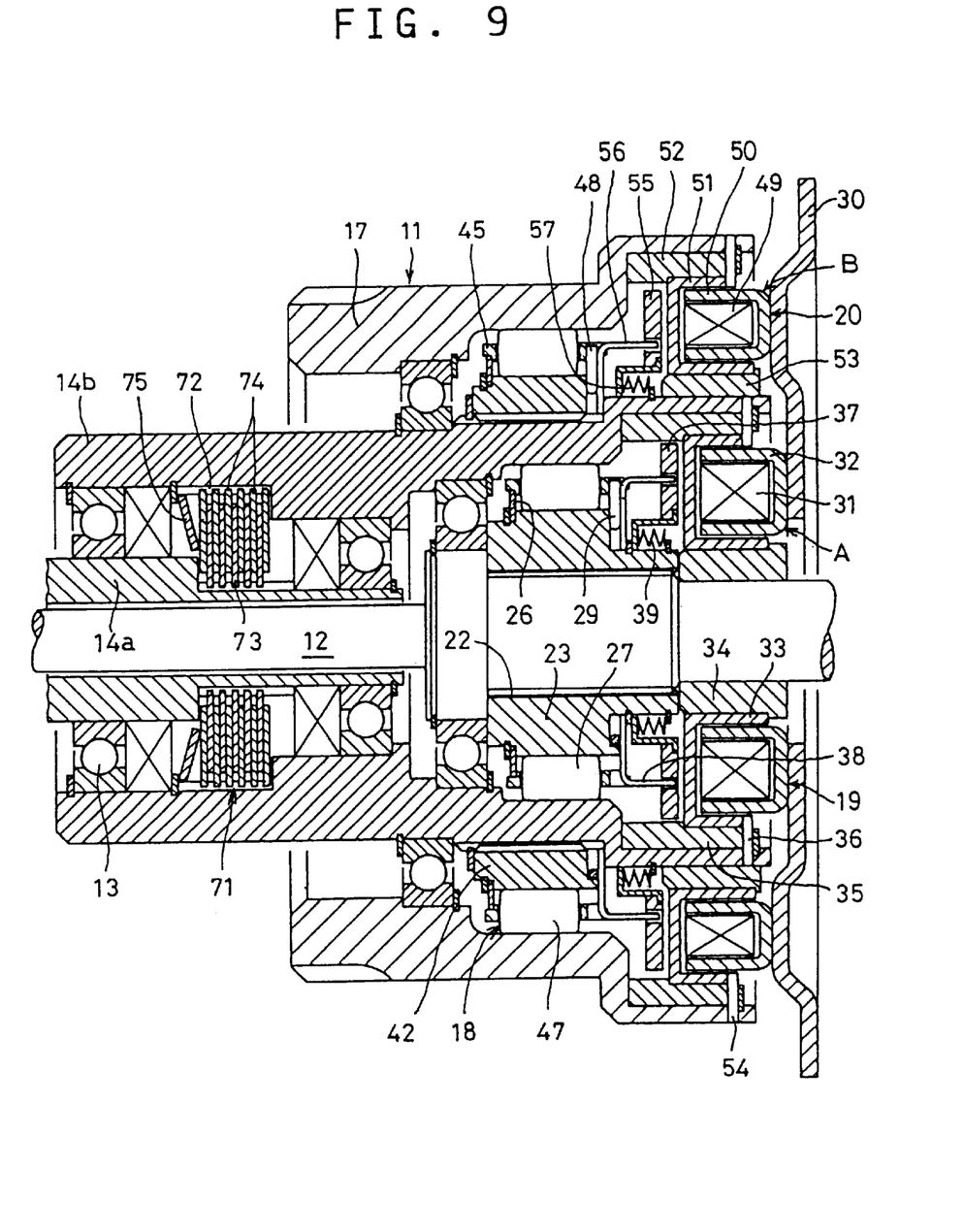
FIGS. 9–12 are vertical sectional views showing first to fourth examples of a resistance means in a third embodiment.

In the first example shown in FIG. 9, the output member is cut at its mid-portion into inner and outer members 14a and 14b mounted one around another, and as the resistance means 71, a multiple-disk clutch 72 is mounted therebetween. The clutch 72 comprises a plurality of inner disks 73 which are nonrotatable relative to the inner output member 14a but movable in the axial direction, and a plurality of outer disks 74 which are nonrotatable relative to the outer output member 14b but movable in the axial direction. The inner and outer disks are superposed alternately and are axially pressed by a plate spring 75 against each other.

Figure 10:
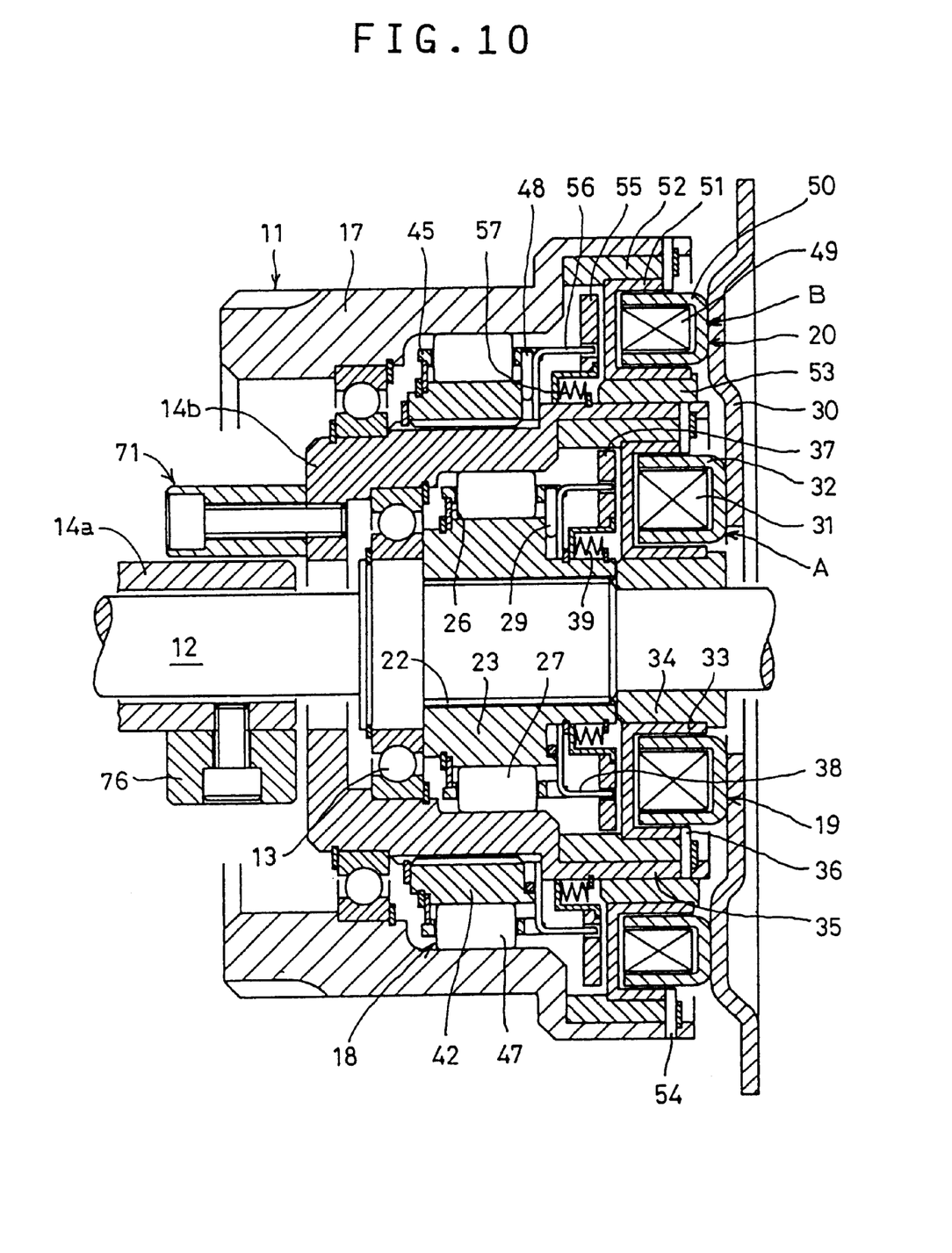

In the second example shown in FIG. 10, the output member 14 is cut at its mid-portion into inner and outer output members 14a and 14b which are coupled together by an elastic coupling 76 as the resistance means 71 made from rubber or other elastic material having the same effect.

Figure 11:
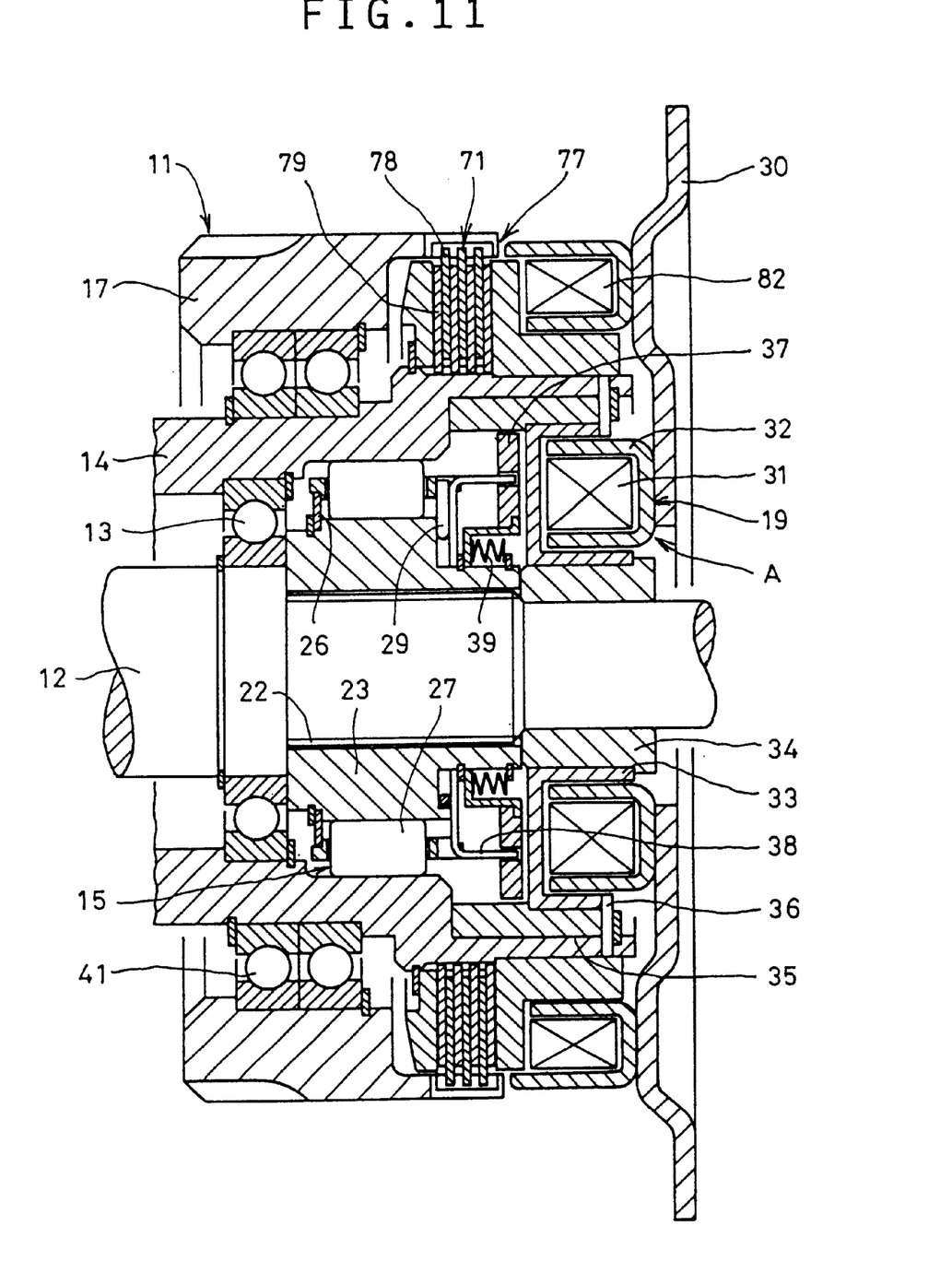

In the third example shown in FIG. 11, between the second input member 17 and the output member 14, as the resistance means 71, a multiple-disk clutch 77 is provided for the second electromagnetic clutch B. It comprises a plurality of outer disks 78 which are nonrotatable relative to the second input member 17 but axially movable, and a plurality of inner disks 79 which are nonrotatable relative to the output member 14 but movable in the axial direction. The outer disks 78 and the inner disks 79 are superposed alternately and are pressed against each other by actuating a fixedly arranged electromagnetic coil 82 to couple the second input member 17 and the output member 14 together.

Figure 12:
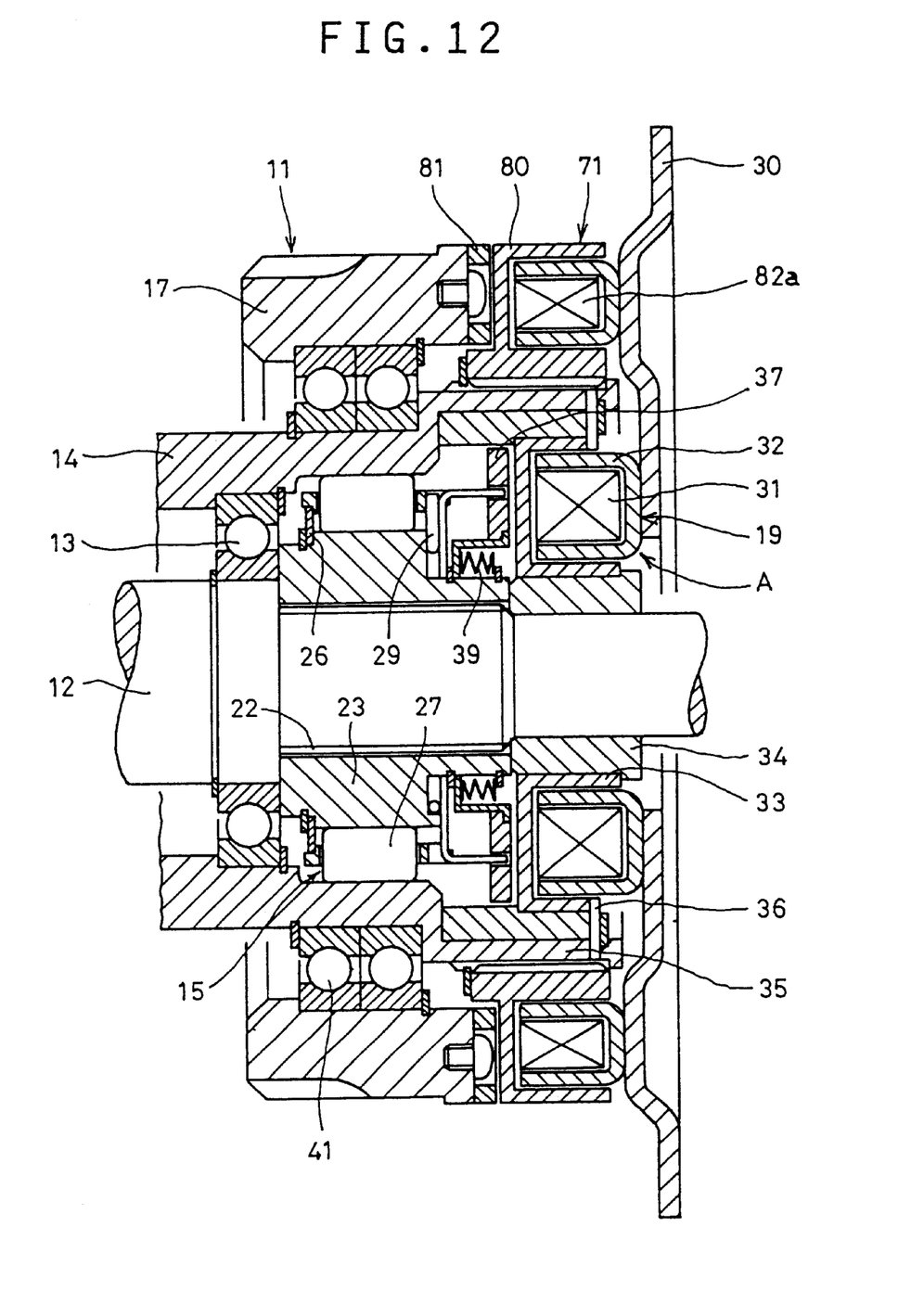

In the fourth example shown in FIG. 12, as the resistance means 71, instead of the multiple-disk clutch 77, a single-disk clutch 80 is provided between the second input member 12 and the output member 14. The single-disk clutch 81 comprises a clutch disk 81 provided at one end of the second input member 17 so as to be nonrotatable but movable in the axial direction. By attracting the clutch disk 81 by the magnetic force produced by actuating a fixedly arranged electromagnetic coil 82a, the clutch 80 couples the second input member 17 and the output member 14 together.

In the power cut/connect device 11 of each example of the third embodiment, since the resistance means 71 for absorbing shocks is provided in a mid-portion of the output member 14 or between the second input member 17 and the output member 14, when the first or second two-way clutch engages to transmit rotation, it is possible to absorb and soften shock by slip or elastic deflection of the resistance means 71 in the rotating direction, so that shockless smooth changeover is possible.

In the embodiments in which the multiple-disk clutch 77 or the single-disk clutch 80 is employed between the second input member 17 and the output member 14, since coupling and uncoupling between the second input member 17 and the output member 14 can be directly made, it is possible to do away with the use of the second two-way clutch 18.

(Fourth Embodiment)

Figure 13:
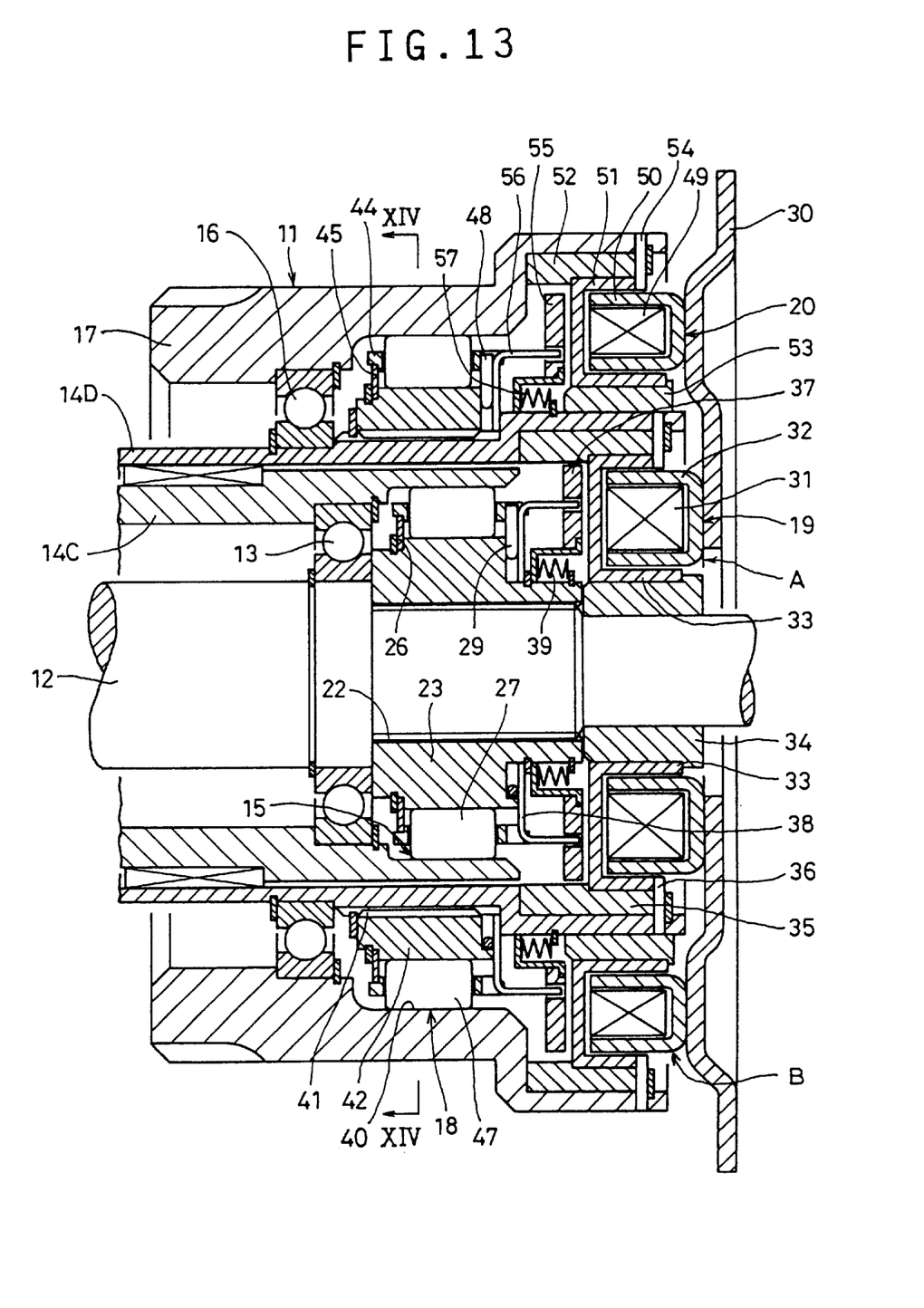
FIG. 13 is a sectional view showing a fourth embodiment.
Figure 14:
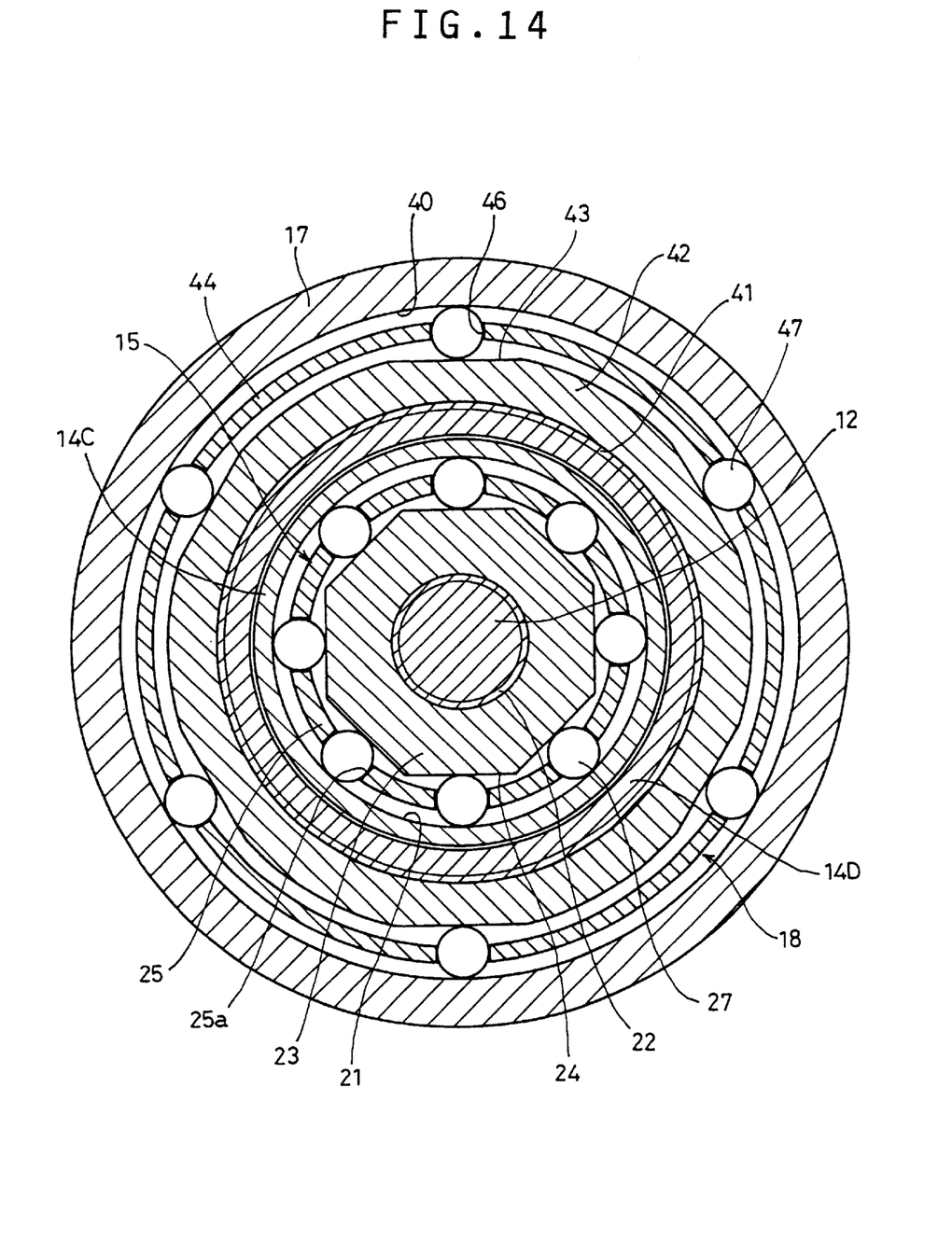
FIG. 14 is a sectional view of the same, similar to FIG. 2.

A fourth embodiment is described with reference to FIGS. 13 and 14. The rotation cut/connect device 11 of this embodiment comprises a first input member 12 which is a shaft connected to a power shaft and rotatably mounted, a cylindrical first output member 14C coaxially mounted around the first input member 12 and rotatably supported by a bearing 13, a first two-way clutch 15 provided between the first input member 12 and the first output member 14C, a cylindrical second output member 14D rotatably mounted around the first output member 14C through a bearing, a cylindrical second input member 17 mounted around the second output member 14D and rotatably supported by a bearing 16, and a second two-way clutch 18 provided between the second input member 17 and the second output member 14D. The device 11 is arranged to cut off and connect power by controlling the first and second two-way clutches 15, 18 by means of first and second control means 19, 20.

In the first to third embodiments, the output member is formed by a single member whereas in the fourth embodiment the output member consists of the first member 14C and the second member 14D rotatably mounted around the first member through a bearing so as to be rotatable relative to each other.

In the fourth embodiment, a cylindrical surface 21 is formed on the inner surface of the first output member 14C and the first retainer 25 is mounted between the outer surface of the cam member 23 and the cylindrical surface 21 of the first output member 14C.

Also, the cam member 42 is mounted on the second output member 14D through spline 41 so as to rotate together, and the second retainer 44 is mounted between the outer surface of the cam member 42 and the inner cylindrical surface 40 of the second input member 17.

The first electromagnetic clutch A as the first control means 19 is provided between the first input member 12 and the inner surface of a large-diameter portion of the first output member 14C. Also, the second electromagnetic clutch B as the second control means 20 is provided between the second output member 14D and the inner surface of a large-diameter portion of the second input member 12.

Because the fourth embodiment is otherwise the same as the first embodiment in structure, detailed description is omitted.

The rotation cut/connect device 11 of the fourth embodiment is structured as mentioned above. In operation, when no current is supplied to the first and second electromagnetic coils 31, 49, by the action of the switch springs 29, 48, the rollers 27, 47 are held in their neutral positions, in which they do not engage the cam surfaces 24, 43. The first two-way clutch 15 thus releases engagement between the first input member 12 and the first output member 14D, while the second two-way clutch 18 releases engagement between the second input member 17 and the second output member 14D, so that the rotations of the first and second input members 12, 17 will not be transmitted to the output members 14C, 14D.

When the electromagnetic coil 31 of the first electromagnetic clutch A is actuated with the first input member 12 rotating, due to its magnetic force, the armature 37 and the rotor 33 are pressed against each other. When the first input member 12 and the first output member 14C tend to rotate relative to each other in this state, due to the frictional force produced between the armature 37 and the rotor 33, the first retainer 25 and the first output member 14C are coupled together into one piece, so that the rollers 27 are moved from the neutral positions on the cam surfaces 24 to engaging positions in the wedge spaces. Thus, the first two-way clutch 15 couples the first input member 12 and the first output member 14C together, so that the rotation of the first input member 12 is transmitted to the first output member 14C.

Thus, when the electromagnetic coil 31 of the first electromagnetic clutch A is actuated, it is possible to lock the first input member 12 and the first output member 14C together. At this time, the rollers 27 are moved to engaging positions, but as shown in FIG. 4, the force applied in one direction to the retainer 25 by the switch spring 29 is axially adjacent the moment applied from the armature 37, and no moment about the axis perpendicular to the central axis acts on the retainer 25. Thus, the retainer 25 can rotate smoothly relative to the first input member 12 with no necessity of using bearings.

Also, as described above, by commonly using the cutout 28b of the cam member 23 both to receive the switch spring 29 and to receive the retaining member 38 of the armature 37, it is possible to reduce the number of working steps and the cost.

Next, when the second electromagnetic coil 49 is actuated with the second input member 17 rotating, like in the case of the first electromagnetic clutch A, due to the magnetic force of the electromagnetic coil 49, the armature 55 and the rotor 51 are pressed against each other. When the second input member 17 and the second output member 14D tend to idle relative to each other, due to the frictional force produced between the armature 55 and the rotor 51, the second retainer 44 and the second input member 17 are coupled together. Thus, the rollers 47 are moved from the neutral positions on the cam surfaces 43 to engaging positions in the wedge spaces, so that the second two-way clutch 18 couples the second input member 17 and the second output member 14D together. The rotation of the second input member 17 is thus transmitted to the second output member 14D.

Thus, by the on-off control of the first and second electromagnetic clutches A, B with the first or second input member 12, 17 rotating, it is possible to transmit and cut off rotation of the first and second input members 12, 17 to the first and second output members 14C, 14D, and further to transmit rotation between the first and second input members 12 and 17. Thus it is possible to use the power cut/connect device of this invention in a wide field in which the transmission and cutoff of driving force have to be changed over.

That is, when the first and second electromagnetic clutches A, B are both turned on with one of the first and second input members 12, 17 rotating, the first and second two-way clutches 15 and 18 will both engage, so that the first and second input members 12 and 17 are coupled together through the first and second output members 14C, 14D and thus it is possible to transmit rotation therebetween.

In the embodiment in which the output member comprises the first member 14C and the second member 14B, too, the arrangement using sprags as the engaging elements as shown in FIGS. 7 and 8 can be adopted.

Also, the arrangement of the third embodiment shown in FIGS. 9–12 can be adopted in the fourth embodiment. That is to say, a resistance means for absorbing shocks may be provided at a midportion of the first output member 14C or between the second input member 17 and the second output member 14D.

As in the first example shown in FIG. 9, the first output member 14C may be cut at its mid-portion into inner and outer members 14a and 14b mounted one around another, and as the resistance means 71, a multiple-disk clutch 72 may be mounted therebetween.

As in the second example shown in FIG. 10, the first output member 14C may be cut at its mid-portion into inner and outer output members 14a and 14b which are coupled together by an elastic coupling 76 as the resistance means 71 made from rubber or other elastic material having the same effect.

As in the third example shown in FIG. 11, between the second input member 17 and the second output member 14D, as the resistance means 71, a multiple-disk clutch 77 may be provided for the second electromagnetic clutch B.

As in the fourth example shown in FIG. 12, as the resistance means 71, instead of the multiple-disk clutch 77, a single-disk clutch 80 may be provided between the second input member 12 and the second output member 14D.

As described above, according to this invention, the first input member is connected to a power shaft, the output member is arranged concentrically with the first input member, the first two-way clutch is provided between the first input member and the output member, the second input member is arranged concentrically with the output member, the second two-way clutch is provided between the second input member and the output member, the first and second two-way clutches are arranged coaxially one around the other, and the control means control the first and second two-way clutches to carry out cutting and transmission of power. Thus changeover of transmission and cutting of the rotation of the first and second input members to the output member can be carried out simply by controlling the control means. Moreover, by coaxial arrangement of the first and second two-way clutches, it is possible to shorten the axial length of the power cut/connect device and make it compact. Thus it can be mounted in a position where the mounting space is narrow, and its use can be expanded.

What is claimed is:

1. A power cut/connect device comprising:
   a first input member coupled to a power shaft and having an outer surface;
   an output member coaxially mounted around said first input member and having an inner surface and an outer surface;
   one of the outer surface of said first input member and the inner surface of said output member being formed with a first cylindrical surface and the other being formed with a plurality of first cam surfaces opposite the first cylindrical surface to define wedge spaces therebetween;
   a first retainer mounted between the first cylindrical surface and the first cam surfaces and formed with a plurality of pockets;
   first engaging elements each received in each of said pockets of said first retainer and capable of interlocking said first input member and said output member together by engaging said first cylindrical surface and said first cam surfaces when said first input member and said output member rotate relative to each other;
   said first cylindrical surface, said first cam surfaces, said first retainer, and said first engaging elements forming a first two-way clutch;
   a second input member coaxially mounted around said output member and having an inner surface;
   one of the outer surface of said output member and the inner surface of said second input member being formed with a second cylindrical surface and the other being formed with a plurality of second cam surfaces opposite the second cylindrical surface to define wedge spaces therebetween;
   a second retainer mounted between the second cylindrical surface and the second cam surfaces and formed with a plurality of pockets;
   second engaging elements each received in each of said pockets of said second retainer and capable of interlocking said output member and said second input member together by engaging said second cylindrical surface and said second cam surfaces when said second input member and said output member rotate relative to each other;
   said second cylindrical surface, said second cam surfaces, said second retainer, and said second engaging elements forming a second two-way clutch;
   said second two-way clutch being disposed radially outwardly of said first two-way clutch;
   said output member functioning both as an outer member of said first two-way clutch and as an input member of said second two-way clutch;
   a control means for individually controlling said first and second retainers to selectively engage and disengage said first and second two-way clutches.

2. The power cut/connect device as claimed in claim 1 characterized in that said first input member has a separate member having a clutch surface on which said first engaging elements of said first two-way clutch lock.

3. The power cut/connect device as claimed in claim 1 wherein said output member has a separate member having a clutch surface on which said second engaging elements of said second two-way clutch lock.

4. The power cut/connect device as claimed in claim 1 wherein said first and second engaging elements are rollers.

5. A power cut/connect device comprising:
   a first input member coupled to a power shaft and having an outer surface;
   an output member coaxially mounted around said first input member and having an inner surface and an outer surface;
   the outer surface of said first input member and the inner surface of said output member being formed with cylindrical surfaces opposite to each other;
   a first retainer mounted between the cylindrical surfaces of said first input member and said output member and formed with a plurality of pockets;
   first engaging elements each received in each of said pockets of said first retainer and capable of interlocking said first input member and said output member together by engaging said cylindrical surfaces when said first input member and said output member rotate relative to each other;
   said cylindrical surfaces, said first retainer, and said first engaging elements forming a first two-way clutch;
   a second input member coaxially mounted around said output member and having an inner surface;
   the outer surface of said output member and the inner surface of said second input member being formed with cylindrical surfaces opposite to each other;
   a second retainer mounted between the cylindrical surfaces and formed with a plurality of pockets;
   second engaging elements each received in each of said pockets of said second retainer and capable of interlocking said output member and said second input member by engaging said cylindrical surfaces when said second input member and said output member rotate relative to each other;
   said cylindrical surfaces, said second retainer, and said second engaging elements forming a second two-way clutch;
   said second two-way clutch being disposed radially outwardly of said first two-way clutch; and
   said output member functioning both as an outer member of said first two-way clutch and as an input member of said second two-way clutch;
   a control means for individually controlling said first and second retainers to selectively engage and disengage said first and second two-way clutches.

6. The power cut/connect device as claimed in claim 5 wherein said first and second engaging elements are sprags.

7. The power cut/connect device as claimed in claim 1 wherein said control means comprise an electromagnet.

8. The power cut/connect device as claimed in claim 1, further comprising a resistance means provided in a midportion of said output member or between said output member and said second input member for softening shocks.

9. The power cut/connect device as claimed in claim 8 wherein said resistance means is a multiple-disk clutch.

10. The power cut/connect device as claimed in claim 8 wherein said resistance means is a single-disk clutch.

11. The power cut/connect device as claimed in claim 8 wherein said resistance means is rubber or an elastic member having the same effect.

12. A power cut/connect device comprising:

a first input member coupled to a power shaft and having an outer surface;

a first output member coaxially mounted around said first input member and having an inner surface and an outer surface;

one of the outer surface of said first input member and the inner surface of said first output member being formed with a first cylindrical surface and the other being formed with a plurality of first cam surfaces opposite the first cylindrical surface to define wedge spaces therebetween;

a first retainer mounted between the first cylindrical surface and the first cam surfaces and formed with a plurality of pockets;

first engaging elements each received in each of said pockets of said first retainer and capable of interlocking said first input member and said first output member together by engaging said first cylindrical surface and said first cam surfaces when said first input member and said first output member rotate relative to each other;

said first cylindrical surface, said first cam surfaces, said first retainer, and said first engaging elements forming a first two-way clutch;

a second output member mounted around said first output member through a bearing;

a second input member coaxially mounted around said second output member and having an inner surface;

one of the outer surface of said second output member and the inner surface of said second input member being formed with a second cylindrical surface and the other being formed with a plurality of second cam surfaces opposite the second cylindrical surface to define wedge spaces therebetween;

a second retainer mounted between the second cylindrical surface and the second cam surfaces and formed with a plurality of pockets;

second engaging elements each received in each of said pockets of said second retainer and capable of interlocking said second output member and said second input member together by engaging said second cylindrical surface and said second cam surfaces;

said second cylindrical surface, said second cam surfaces, said second retainer, and said second engaging elements forming a second two-way clutch;

a control means for individually controlling said first and second retainers for selectively engaging and disengaging said first and second two-way clutches.

13. The power cut/connect device as claimed in claim 12 wherein said first input member has a separate member having a clutch surface on which said first engaging elements of said first two-way clutch lock.

14. The power cut/connect device as claimed in claim 12 wherein said second output member has a separate member having a clutch surface on which said second engaging elements of said second two-way clutch lock.

15. The power cut/connect device as claimed in claim 12 wherein said control means comprise an electromagnet.

16. The power cut/connect device as claimed in claim 12 wherein said engaging elements are rollers.

17. The power cut/connect device as claimed in claim 12 wherein said engaging elements are sprags.

18. The power cut/connect device as claimed in claim 12 wherein a resistance means for softening shocks is provided between said input member and said second output member.

19. The power cut/connect device as claimed in claim 18 wherein said resistance means is a multiple-disk clutch.

20. The power cut/connect device as claimed in claim 18 wherein said resistance means is a single-disk clutch.

21. The power cut/connect device as claimed in claim 18 wherein said resistance means is rubber or an elastic member having the same effect.

22. The power cut/connect device as claimed in claim 5 wherein said control means comprise an electromagnet.

23. The power cut/connect device as claimed in claim 5, further comprising a resistance means provided in a mid-portion of said output member or between said output member and said second input member for softening shocks.

* * * * *